Oct. 28, 1958             E. DASH             2,858,414
ALUMINUM COATED STUD
Filed May 18, 1953
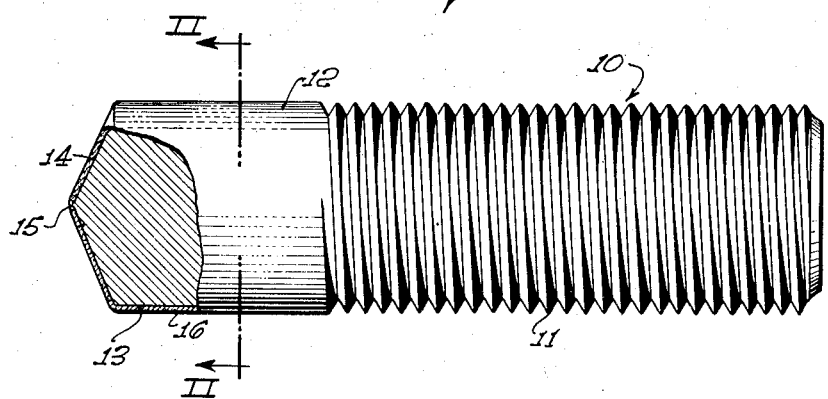
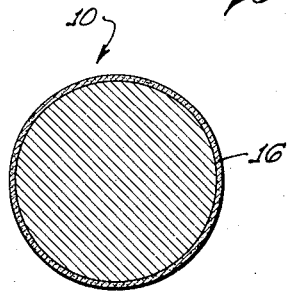
EDWARD DASH,
INVENTOR.
BY
ATTORNEY.

United States Patent Office 2,858,414
Patented Oct. 28, 1958

2,858,414

ALUMINUM COATED STUD

Edward Dash, Long Beach, Calif.

Application May 18, 1953, Serial No. 355,700

7 Claims. (Cl. 219—99)

This invention relates to a flux-clad stud adapted to be butt welded to a metal plate or other metal member by an electrical-arc stud-welding process.

Electrical welding of a metal stud to a metal plate generally includes the drawing of an electrical arc between an end face of a metal stud and the adjacent surface of the metal member until the opposed metal portions are properly heated and melted, immediately after which the stud and metal member are joined under pressure. Coalescence of the metal of the stud and member to which it is being welded must be protected and facilitated in order to secure a sound weld free of porosity and metal-oxide inclusions. Heretofore various flux materials have been used in various ways for this purpose.

Prior uses of flux material for stud welding have included depositing of a metallic-flux material loosely on the weld area. Obviously, this method is subject to many disadvantages because the deposited flux material may be readily displaced from the weld area and there is little control over the quantity of flux material made available during the welding process. Furthermore loose metallic-flux material cannot be applied to vertical or overhead surfaces of metal members. Other prior methods of supplying flux materials for a stud to be welded have included various ways of carrying selected quantities of flux material on the welding stud. One such prior-proposed welding stud included an end face provided with a recess in which a quantity of flux material was contained. In order to retain the flux material in the recess, a suitable cap was provided for covering the end face (Nelson, 2,402,659) or the walls of the recess were formed in such a manner that a plurality of tabs were provided which were folded radially inwardly so as to retain the flux material in the recess (Evans, 2,455,244). Another prior-proposed method of carrying flux material on the end of a welding stud included forming an annular groove on the end of the stud for carrying an annular collar of fluxing material. A fluxing material was mixed with an adhesive for retaining the material in the groove.

In such prior-proposed welding studs a selected, limited quantity of flux was provided adjacent to the weld end of the stud. The entire quantity of metallic flux material carried by the welding stud was made available at substantially the same moment. In other words, the limited quantity of flux material was utilized as a batch. Such a method of stud welding had the disadvantage of not being capable of allowing for different applications or for operating variations inherent in stud-welding equipment used, such variations resulting in a variable quantity of heat developed at the arc, with a consequent variation in volume of metal deposited from the stud. As a result, only rarely was the correct amount of flux supplied to the molten metal during the welding process and the distribution of flux during the welding time was nonuniform. Such prior studs had the disadvantage of being expensive to manufacture because of the machining of recesses or grooves on the weld end portion of the stud.

This invention contemplates a welding stud which obviates the disadvantages of the prior studs and achieves advantages not capable of being attained by such prior studs.

The primary object of this invention is to disclose and provide a welding stud wherein the flux material is carried by the stud in such a manner that it is continuously supplied to the molten metal in proper proportions during the welding process.

An object of this invention is to disclose and provide a welding stud which is inexpensive to manufacture, in which the flux is applied to the stud by simple, economical and effective means, and wherein additional, costly machining operations on the stud for retaining or holding the flux material are eliminated.

Another object of this invention is to disclose and provide a welding stud wherein the flux material is supplied in correct proportions to the molten weld metal deposited from the weld-end portion of the stud so as to effectively act as a scavenging and deoxidizing agent in the molten weld metal during the entire welding process.

A further object of this invention is to disclose and provide a welding stud having a suitable quantity of flux material carried on the end face of the stud for facilitating initiation and stabilization of an electrical arc.

A still further object of this invention is to disclose and provide a welding stud which is entirely coated with a flux material, such as aluminum particles of selected thickness so as to provide proper proportions of flux material during the welding process and to serve as a corrosion resistant coating for the non-welded portion of the stud.

Other objects and advantages will be readily apparent from the following description of the drawings.

In the drawings:

Fig. 1 is a side elevation view of a welding stud embodying this invention, the weld-end portion of said stud being shown in section.

Fig. 2 is a transverse cross-sectional view taken in the plane indicated by line II—II of Fig. 1.

An exemplary welding stud indicated at 10 may include an elongated stud body member or metal element having a threaded portion 11 and a weld-end portion 12. It is understood that the threaded end portion 11 affords well-known suitable means for utilizing the stud as a fastening means and that while a threaded end portion is illustrated, any other suitable type of fastening means may be employed of different section and of different configuration.

The weld-end portion 12 may be of suitable cross section and is illustrated as being of solid cylindrical form. The weld-end portion includes smooth, longitudinally extending, uninterrupted surfaces 13 and an end face 14. The end face is exemplarily shown as being of shallow cone shape and terminates in a point 15. It is understood that the end face may be sharply pointed or may be a simple flat surface.

The entire stud is covered with a continuous uninterrupted coating 16 of virtually uniform thickness of a selected flux material. The coating 16 preferably is made of aluminum particles carried in a suitable vehicle, the vehicle having the characteristic of tightly clinging to the surfaces of the metal of the stud. An aluminum flux coating thus not only provides a protective corrosion-resistant coating for the entire welding stud but also serves to provide a flux material which is effectively distributed on the stud weld-end portion for making available and supplying necessary amounts of flux during a welding operation.

The coating 16 conforms to the configuration of the welding stud and thus does not interfere with the functional design of the welding stud. For example, if desired, the welding stud may be threaded throughout its entire length. The flux coating at either end will serve the purpose for which it is intended while still permitting the threaded stud to threadedly receive a nut for fastening a material or member to the stud.

In this connection it should be noted that the coating 16 is an electrical conductor and may provide a path for electrical current to the end face at which the electrical arc is initiated. Special provision need not be made to provide a current-receiving end or an arc-initiating end as in the case of well-known welding rods in which the flux material is electrically non-conductive.

The thickness of the coating of flux material is selected so that sufficient aluminum particles are provided on the end face 14 of the stud so as to supply a selected quantity of flux material to facilitate arc initiation and stabilization at the beginning of the welding process. Thus consistent results are achieved under conditions of quantity production of stud welds such as in shipbuilding, due to the fact that erratic arc initiation is virtually eliminated by the use of flux-clad studs of this invention.

The thickness of the aluminum coating 16 is correlated to the area of the weld-end portion so that as incremental, transverse cross-sectional portions of the metal of the weld-end portion are melted during welding a proper amount of aluminum flux-material coating is provided from the corresponding adjacent, incremental annular ring of the coating. Thus as incremental sections of metal are melted from the weld-end portion, the desired and proper quantity of flux material is supplied to the melted metal of the cross section for properly scavenging and for deoxidizing the molten weld metal. On steel studs having diameters including ¼" and ⅝" it has been found that a flux-coating thickness of approximately .0005 in. provides the proper proportion of flux material. The percentage by weight of the aluminum in such a coating to the deposited weld metal should lie in the range of .02 to .18.

It will thus be apparent that the coating of flux material on the weld-end portion will afford proper amounts of flux material even though the weld-end portion is melted to a greater extent than contemplated or melted to a lesser extent than contemplated. Thus the continuous availability of flux material, regardless of variable operating conditions or an intended abnormal burn-off provides a correct amount of flux at all times even though the amount of metal deposited from the welding end of the stud varies.

Furthermore, the annular incremental ring of flux material results in uniform distribution of flux material as the incremental metal section is melted. As a result, welds made with the flux-clad stud as above described, are free from porosity and oxide inclusions over a wide range of welding conditions.

The welding stud described above may be simply manufactured by first thoroughly cleaning welding studs by suitable well-known methods such as vapor-degreasing so as to remove all oil, grease and dirt. Studs so cleaned may be then sprayed with a flux material in liquid form or immersed into a tank of liquid-flux material until a flux coating has been deposited on the surface of the stud. After the studs are removed from the tank they may be allowed to dry either naturally in ambient atmosphere or by forced air.

While a flux material consisting of aluminum particles, contained in a suitable vehicle has been described above, it is understood that any suitable, electrically conductive flux material may be used. The described aluminum coating is preferable because it is a chemically active material which has a great affinity for oxygen and chemically combines therewith both to deoxidize the molten metal and also to prevent formation of undesirable oxides. Furthermore the aluminum coating aids in the formation of weld metal having fine-grain structure and having sound porosity-free characteristics. In addition the contour conforming coating on the non-welded portion of the stud affords a corrosion-resistant coating which lengthens the life of the stud and which maintains the stud in condition for facilitating fastening and unfastening of nuts carried thereby.

The welding stud of this invention provides a welding stud on which is carried a proportioned coating of flux material for the welding operation and also provides a welding stud which is protected against oxidation and rusting.

It will be understood by those skilled in the art that a flux-clad welding stud of the character described may be made of different section and the coating of flux material may be varied in thickness depending upon the section of the stud so as to provide a correct proportion of flux material for the amount of metal melted during the welding operation. Any changes and modifications in the welding stud above described coming within the scope of the appended claims are embraced thereby.

I claim:

1. A flux clad welding stud providing full weld strength regardless of amount of burn-off of stud metal during welding, comprising: a stud body member including a weld end portion of selected cross section; a continuous, uniform coating of electrically conductive flux material covering all longitudinal surfaces of said body member and said weld end portion whereby welding current is transmitted through said conductive coating, the thickness of said coating being directly related to the amount of metal in incremental transverse sections of the weld end portion whereby flux material in predetermined selected quantity is made available for melted metal of each incremental section during welding.

2. A corrosive resistant, aluminum clad welding stud, comprising: a stud body member including a weld end portion of selected cross section and means for uniformly distributing and supplying flux during welding to said weld end portion regardless of amount of metal melted during welding including an electrically conductive aluminum coating of flux material of selected thickness completely covering all longitudinal surfaces of the body member and all surfaces of the weld end portion.

3. A welding stud entirely clad with corrosion resistant flux material, comprising: an elongated stud element having a tip adapted to be positioned adjacent a metal member for initiation of a welding arc, and a continuous, unbroken coating of corrosion resistant, electrically conductive flux material covering all surfaces of said stud element including said tip whereby flux may be continuously supplied during welding and flux at said tip promotes initiation of said arc and stability thereof.

4. A flux clad welding stud, comprising: an elongated stud element having an end portion adapted to be welded to a metal member, and a continuous unbroken aluminum coating virtually, uniformly covering all surfaces of said stud element, said aluminum coating being corrosion resistant and providing an electrically conductive flux material available for continuous supply to melted stud metal regardless of amount of stud metal melted.

5. A welding stud comprising: an elongated stud element having an end portion adapted to be welded to a metal member, and a continuous coating of electrically conductive flux material of selected thickness virtually uniformly covering all surfaces of said stud element whereby welding current can be transmitted through said coating from a portion of the stud remote from the end portion to the end portion to be welded and whereby flux material is available for continuous supply to the end portion being welded in proportion to the stud metal melted.

6. A welding stud as stated in claim 5 wherein the flux coating includes aluminum and wherein the weight of aluminum in the flux coating in proportion to the metal deposited during welding is between .02 percent to .18 percent.

7. A welding stud adapted to be held in a chuck of a welding gun and provided with a proportioned amount of flux material affording full weld strength regardless of the amount of burn-off of the stud during welding, comprising: a stud body member having a weld end portion, an opposite end portion adapted to be held in said chuck, and a body portion between said end portions including stud metal to be deposited as weld metal during burn-off; and a continuous, uniform coating of electrically conductive flux material covering at least all surfaces of the weld end portion and the surfaces of the body portion encompassing stud metal to be deposited as weld metal, the uniform thickness of said coating being in preselected proportion to the amount of adjacent stud metal to be deposited during welding for continuous supply of preselected amounts of flux material.

References Cited in the file of this patent

UNITED STATES PATENTS

| | | |
|---|---|---|
| 1,027,782 | Watrous | May 28, 1912 |
| 2,319,977 | Cape et al. | May 25, 1943 |
| 2,384,403 | Somers | Sept. 4, 1945 |
| 2,413,370 | Palmer | Dec. 31, 1946 |
| 2,455,244 | Evans | Nov. 30, 1948 |
| 2,462,882 | Martin | May 1, 1949 |
| 2,506,747 | Smith | May 9, 1950 |
| 2,638,525 | Candy | May 12, 1953 |